Patented Nov. 30, 1943

2,335,463

UNITED STATES PATENT OFFICE 2,335,463

GLASS COMPOSITIONS

Hans Steinbock, Dusseldorf-Gerresheim, Germany; vested in the Alien Property Custodian No Drawing. Application July 12, 1939, Serial No. 284,099. In Germany June 27, 1938

5 Claims. (Cl. 106—50)

The invention relates to a moisture- and heat-resistant glass poor in or substantially free from alkali ingredients which is easy to melt and has a low softening point and which is especially suited for the manufacture of finest glass fibers and filaments.

As is well-known, the alkali present in the surface layers of alkaline glasses is more or less dissolved and lixiviated under the influence of atmospheric moisture, this action being even more severe under the direct influence of water or water vapors, such as steam. The dissolved alkali in conjunction with the moisture forms a coating or film which continues to attack the glass. Moreover, this coating is electrolytically conductive and deteriorates or destroys metal parts that may be in contact with it. As the moisture attacks the glass at the surface, the degree of attack or the amount of lixiviated alkali while depending on the temperature and moisture of the surrounding atmosphere is primarily dependent on the specific size of the glass surface. The attack is therefore particularly severe with fine glass fibers or filaments which present an enormous specific surface as compared, for example, with thick-walled glass vessels or implements.

Hitherto, there had to be used for technical purposes glass with a certain content of alkali, because the known glasses free or substantially free from alkali are very difficult to melt and due to their high softening point also difficult to form or work. For this reason, one has used the common technical glasses with a more or less high content in alkali also for the production of fibers and filaments.

Lately, fine glass fibers and filaments are increasingly used not only for heat insulations but also for electric insulations. However, in the latter case the insulating power of the fibers is rapidly reduced or lost when they are exposed to the influence of moisture which causes the alkaline surface layers of the fibers to become electrolytically conductive. Therefore, it was necessary to impregnate or coat the fibrous insulations or fibers with water-repellent or moisture-resistant substances, such as suitable varnishes and the like. But these coatings are much inferior to glass as regards thermal resistance. An impregnated or varnished glass fiber insulation can at most be heated up to 200° C., while glass can easily stand temperatures up to 500° C. and more without any damage. The favorable thermal properties of glass therefore cannot be fully utilized when the fibers are coated as indicated.

Necessity therefore arose to make such fibers or filaments, especially when to be used for electrical insulations or for purposes requiring high thermal and chemical resistance, of glass poor in or free from alkali.

The known glasses of this kind have the disadvantage that very high temperatures and a long period of time are required to melt them, wherefore special furnaces of highly refractory material must be used, and that their forming or working temperatures are also very high. The production and working of these glasses, especially the formation of fibers or filaments therefrom is therefore difficult and expensive.

It is the object of the present invention to provide a glass composition poor in or free from alkali which can be molten without any difficulties at the common temperatures of 1380° to 1450° C. in ordinary melting furnaces and in the usual period of time and which can be worked, for example drawn to fine fibers or filaments, at temperatures not much higher than the working temperature of the ordinary commercial glass, and which is highly resistant to heat, moisture and chemicals.

I have discovered that the above properties are inherent in a glass containing not more than about 55 to 60% silicic acid, no alkali or less than 10% alkali, about 20 to 30% earth alkalies, preferably barium oxide or strontium oxide, not more than 10 to 15% boric acid, and additions of about 3 to 10% alumina, iron oxide and/or manganic oxide and about 2 to 8% zinc oxide and/or cadmium oxide. In a batch free from alkali with less than 60% silicic acid, about 20 to 30% earth alkalies and less than 15% boric acid, suitable proportions for the additions are 5% alumina, 1 to 5% zinc oxide or cadmium oxide or both together, about 2 to 10% iron oxide or manganic oxide or both together, and up to 1% fluorine.

The use of barium oxide or strontium oxide instead of the ordinarily used calcium oxide reduces the tendency of the glass to devitrify. The glass properties in general are further improved by the said addition of 3 to 10% of trivalent oxides, such as alumina, iron oxide and manganic oxide either singly or together, and of 2 to 8% of bivalent oxides, such as zinc oxide and cadmium oxide either singly or together.

An example of a batch composition according to the invention for a glass poor in alkali is as follows:

| | Parts by weight |
|---|---|
| Glass melting sand | 365 |
| Borax | 225 |
| Feldspar | 250 |
| Heavy spar | 250 |
| Dolomite | 95 |
| Zinc oxide | 20 |
| Soda | 30 |

The glass obtained from this batch has the following composition:

| | Per cent |
|---|---|
| Silicic acid | 53.5 |
| Boric acid | 7.5 |
| Alumina | 5 |
| Barium oxide | 19 |
| Lime | 3 |
| Magnesium oxide | 2 |
| Zinc oxide | 2 |
| Alkali oxides | 8 |

A glass of this kind has a high coefficient of expansion as compared with the ordinary Jena glass poor in alkali. As a result thereof fibers made from this glass will have high mechanical stresses, the favorable influence of which on the mechanical and chemical properties of the glass surface is well-known.

As stated above, the alumina can be wholly or partly replaced by iron oxide, manganic oxide or other trivalent oxides, the zinc oxide can be wholly or partly replaced by cadmium oxide and the barium oxide can be wholly or partly replaced by strontium oxide, lime and magnesium oxide or one or more of these oxides.

The glass is also very resistant against chemical attacks in spite of the low percentage of silicic acid and boric acid. Therefore, only very little alkali can be dissolved even by very moist air, so that fibers or filaments made therefrom lend themselves admirably well for the manufacture of woven or knitted tapes or tubes for electrical insulating purposes.

Moreover, the tendency of the glass to devitrify is extremely low in spite of the high contents in earth alkali. Also it can be easily worked or formed in spite of its low content of alkali. Thus, it can be drawn into finest fibers of any desired length, which are also well suited for textile purposes because of their good elastic and mechanical properties.

An example of a batch composition according to the invention for a glass free from alkali is as follows:

| | Parts by weight |
|---|---|
| Glass melting sand | 550 |
| Hydrated boric acid | 310 |
| Hydrated alumina | 75 |
| Dolomite | 95 |
| Zinc oxide | 20 |
| Heavy spar | 250 |
| Calcined pyrites | 20 |
| Manganese ore | 10 |
| Calcium fluoride | 20 |

The glass obtained from this batch has the following composition:

| | Per cent |
|---|---|
| Silicic acid | 53.5 |
| Boric acid | 13 |
| Alumina | 5 |
| Iron oxide | 1.7 |
| Manganic oxide | 0.8 |
| Zinc oxide | 2 |
| Barium oxide | 19 |
| Lime | 3 |
| Magnesium oxide | 2 |
| Fluor | Traces |

Variations may be made in the composition within the afore-mentioned limits.

This glass possesses the same favorable properties as the glass of the first example. As it is entirely free from alkali it has a particularly high resistance against moisture, steam and other chemical attacks.

Various modifications and variations may be resorted to without departing from the spirit and scope of the present invention as defined in the appended claims.

Having thus described my invention, what I claim as new and desire to secure by Letters Patent is:

1. As a product of manufacture, fibrous glass the glass whereof contains 55 to 60% silica, 10 to 15% boric acid, 20 to 30% earth alkalies consisting preponderantly of barium oxide, and 3 to 10% trivalent oxides selected from the group consisting of alumina, iron oxide and manganese oxide.

2. As a product of manufacture, fibrous glass the glass whereof contains 55 to 60% silicic acid, 10 to 15% boric acid, 20 to 30% earth alkalies consisting preponderantly of barium oxide, 3 to 10% trivalent oxides, and 2 to 8% bivalent metallic oxides selected from the group consisting of zinc oxide and cadmium oxide.

3. Glass in fibrous form, the glass thereof containing 55 to 60% silicic acid, 10 to 15% boric acid, 20 to 30% of an earth alkali selected from the group consisting of barium oxide and strontium oxide, 3 to 10% trivalent oxides, and 2 to 8% zinc oxide.

4. Glass in fibrous form, the glass thereof containing 55 to 60% silicic acid, 10 to 15% boric acid, 20 to 30% of an earth alkali selected from the group consisting of barium oxide and strontium oxide, 3 to 10% trivalent oxides, and 2 to 8% cadmium oxide.

5. Glass in fibrous form containing 55 to 60% silicic acid, 20 to 30% barium oxide, 10 to 15% boric acid, about 5% alumina, 1 to 5% zinc oxide, and 2 to 10% iron oxide.

HANS STEINBOCK.